(12) United States Patent
Walkinshaw et al.

(10) Patent No.: US 6,547,326 B1
(45) Date of Patent: Apr. 15, 2003

(54) AUTOMOTIVE SEAT FLIP-OUT CUPHOLDER

(75) Inventors: Alan Walkinshaw, Plymouth, MI (US); Todd Boger, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,933

(22) Filed: Nov. 1, 2001

(51) Int. Cl.$^7$ .................................................. A47C 7/62
(52) U.S. Cl. .................................................. 297/188.01
(58) Field of Search ....................... 297/188.01, 188.16, 297/188.15, 188.19, 115, 112, 113; 224/275; 248/311.2

(56) References Cited

U.S. PATENT DOCUMENTS

| | | | |
|---|---|---|---|
| 3,083,998 A | * | 4/1963 | Morris |
| 4,733,908 A | | 3/1988 | Dykstra ........................ 297/194 |
| 5,248,183 A | * | 9/1993 | Gignac et al. |
| 5,302,000 A | * | 4/1994 | Ayotte |
| 5,318,343 A | * | 6/1994 | Spykerman et al. |
| 5,390,976 A | * | 2/1995 | Doughty et al. |
| 5,660,433 A | * | 8/1997 | Bruhnke et al. |
| 5,720,514 A | | 2/1998 | Carlsen ....................... 297/188.1 |
| 5,746,363 A | * | 5/1998 | Teller et al. |
| 5,779,302 A | * | 7/1998 | Geier et al. |
| 5,848,820 A | | 12/1998 | Hecht ....................... 297/188.1 |
| 5,911,470 A | * | 6/1999 | Aumond |
| 6,085,953 A | | 7/2000 | Bober ........................ 224/282 |
| 6,139,096 A | | 10/2000 | Anderson ................. 297/188.1 |
| 6,217,112 B1 | * | 4/2001 | Linsenmeier et al. |

\* cited by examiner

*Primary Examiner*—Milton Nelson, Jr.
(74) *Attorney, Agent, or Firm*—Gigette Bejin

(57) ABSTRACT

A cupholder assembly forms the forward support edge of an automotive vehicle seat. The cupholder assembly includes a lid member that is pivotally movable into a opened, operative position in which the lid member is positioned to rest on the floor carpet immediately beneath the cupholder to minimize vibrations and to provide support therefor. The cupholder assembly is formed with a breakaway hinge incorporating a stop mechanism to cease the rotation of the cupholder when the lid member is moved into the operative position. A three-tiered container holder structure accommodates a wide variety of sizes of cups, mugs and other drink containers. Once the lid member is pivoted into the open, operative position, an open support area of sufficient size to accommodate fast food containers is exposed immediately behind the container holders. When in the closed, inoperative position, the lid member exposes an outer surface covered with the same material as the automotive vehicle seat so as to appear to be an integral part of the seat structure.

18 Claims, 3 Drawing Sheets

AUTOMOTIVE SEAT FLIP-OUT CUPHOLDER

BACKGROUND OF INVENTION

This invention relates generally to a cupholder apparatus for an automobile and, more particularly, to a flip-out cupholder formed as part of the forward edge of the central part of the vehicle seat.

Cupholders are a common convenience found in most automobiles today. Cupholders can be found in a variety of places in different automobiles, including in the front control panel or dash, near the gear shift lever, in a central console to be opened either forwardly or rearwardly. In U.S. Pat. No. 5,746,363, issued to Bill Teller, et al., the cupholder is mounted in the forward portion of the vehicle seat in cooperation with a spring-loaded mechanism for extracting the cupholder from a closed position housed within the seat structure to an outwardly projected operative position. Similarly, the cupholder in U.S. Pat. No. 4,733,908, issued to Ronald A. Dykstra, et al., projects from a retracted, stowed position by a spring mechanism to move the cupholder into an extended operative position. In both of these cupholder devices, the spring mechanism is subject to wear and abuse, tending to cause the cupholder to break and, therefore, to malfunction.

Another form of cupholders can be found in U.S. Pat. No. 5,720,514, issued to Patrick J. Carlsen, et al., which is formed as a major portion of a structure, such as a center console that pivotally moves from a stored position in which the inoperative cupholder functions as the other structure, i.e. the center console, but can be pivoted into an operative position in which the purpose as the former structure is converted and no longer usable as such. In other words, such cupholders can be used either as a cupholder or as the other structure in which the cupholder is hidden. Similarly, the cupholder in U.S. Pat. No. 5,848,820, issued to Robert Hecht, et al., converts the rear center seat console into a cupholder by a pivotal movement of the structure, thus obliterating the usefulness of the structure as anything other than a cupholder when pivoted into the operative position. Likewise, the converted center console shown in U.S. Pat. No. 6,139,096, issued to Rick A. Anderson, et al., can be pivoted into an operative cupholder, and tray assembly, though destroying the operative use of the center console as a support.

U.S. Pat. No. 6,085,953, issued to Bruce B. Bober, et al., is representative of another form of cupholder in which the cupholder can be collapsed into the wall of a structure, such as the rear wall of the center console of the front seat assembly of a vehicle, and pivoted into an outwardly extended operative position. Such cupholders are typically formed as a pivoted door member that is movable into an operative position to expose a minimalistic cupholder. To save space when in the stored position, such cupholders typically provide for a pivoted substructure that can be moved into a position to form the container holder structure, such as is depicted in U.S. Pat. No. 4,733,908 (Dykstra).

It would be desirable to provide a cupholder assembly that can be formed as the front edge of a seat so as to be operable to function as a support portion of the seat when in the closed position, but when pivoted into an operative position exposes not only a cupholder but a storage area for the support of another disposable member, such as a fast food bag.

SUMMARY OF INVENTION

It is an object of this invention to provide a cupholder apparatus that is formed as the forward portion of the vehicle seat when in a stowed, inoperative position.

It is another object of this invention to provide a cupholder structure that when moved into the opened, operative position exposes an open support space of a size for the placement of fast food containers.

It is a feature of this invention that the cupholder is provided with a three-tiered configuration to accommodate a wide range of sizes of cups, mugs and other containers.

It is an advantage of this invention that the cupholder is configured to receive different sizes of containers within the container holder structure.

It is another feature of this invention that the cupholder is concealed within the structure of the seat when in a stowed, inoperative position.

It is another advantage of this invention that the seat structure can be used as a seating support whenever the cupholder is placed into the stowed, inoperative position.

It is still another feature of this invention that the cupholder can be concealed by a piece of leather attached to the cupholder causing the cupholder to appear to be an integral part of the seat structure.

It is still another object of this invention to provide a cupholder apparatus that is formed as part of the seat structure to be located in an ergonomically accessible location for the driver of the vehicle.

It is yet another feature of this invention that the cupholder apparatus is positioned advantageously to avoid blocking the controls for the radio or other devices on the front console of the vehicle.

It is yet another object of this invention to form the cupholder apparatus so that the cupholder will be positioned immediately above the surface of the floor carpet so as to obtain support therefrom when in the opened, operative position.

It is still another advantage of this invention that the opened cupholder obtaining support from the floor carpet of the vehicle will have vibrations reduced thereby.

It is a further object of this invention to provide a flip-out cupholder apparatus that incorporated a breakaway hinge to protect the cupholder from abusive loads imposed thereon during usage in the opened, operative position.

It is yet another feature of this invention that the breakaway hinge incorporates a stop mechanism that arrests movement of the flip-out cupholder apparatus when the cupholder apparatus moves into the opened, operative position.

It is still a further object of this invention to provide a cupholder apparatus formed as the front support edge of a vehicle seat which is durable in construction, inexpensive of manufacture, carefree of maintenance, facile in assemblage, and simple and effective in use.

These and other objects, features and advantages are accomplished according to the instant invention by providing a cupholder assembly which forms the forward support edge of an automotive vehicle seat. The cupholder assembly includes a lid member that is pivotally movable into an opened, operative position in which the lid member is positioned to rest on the vehicle floor carpet immediately beneath the cupholder to minimize vibrations and to provide support therefor. The cupholder assembly is formed with a breakaway hinge incorporating a stop mechanism to cease the rotation of the cupholder when the lid member is moved into the operative position. A three-tiered container holder structure accommodates a wide variety of sizes of cups, mugs and other drink containers. Once the lid member is pivoted into the open, operative position, an open support area of sufficient size to accommodate fast food containers is exposed immediately behind the container holders. When in the closed, inoperative position, the lid member exposes an outer surface covered with the same material as the automotive vehicle seat so as to appear to be an integral part of the seat structure.

BRIEF DESCRIPTION OF DRAWINGS

The advantages of this invention will become apparent upon consideration of the following detailed disclosure of the invention, especially when taken in conjunction with the accompanying drawings wherein.

DETAILED DESCRIPTION

Figure 1:
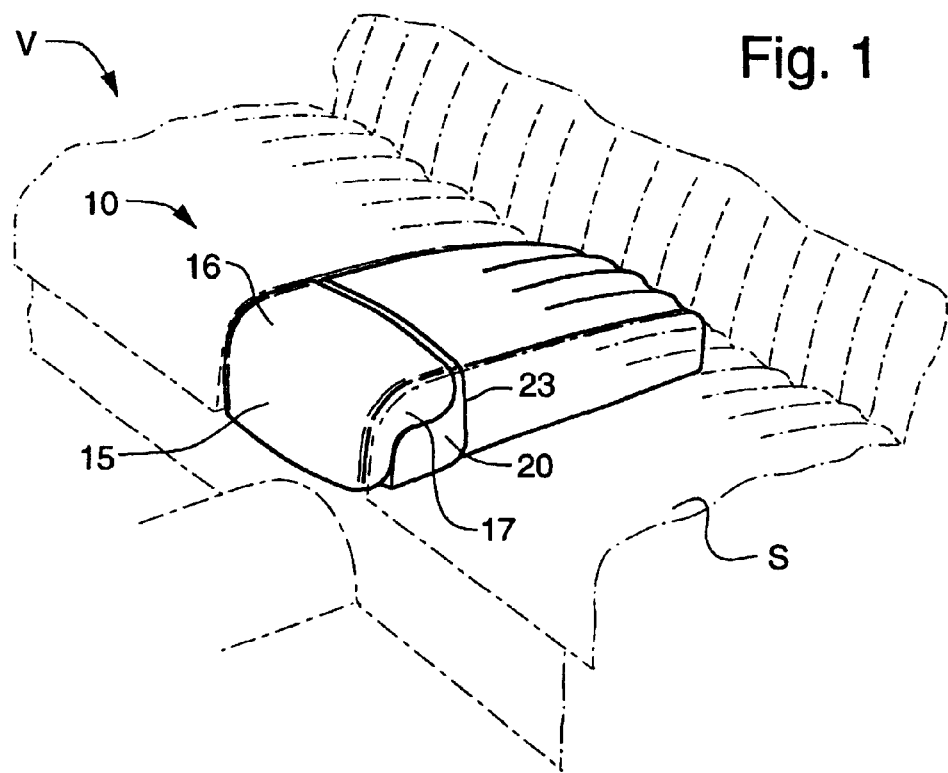
FIG. 1 is a left, front perspective view of the cupholder in the closed position, the adjoining seat structure being depicted in phantom.
Figure 2:
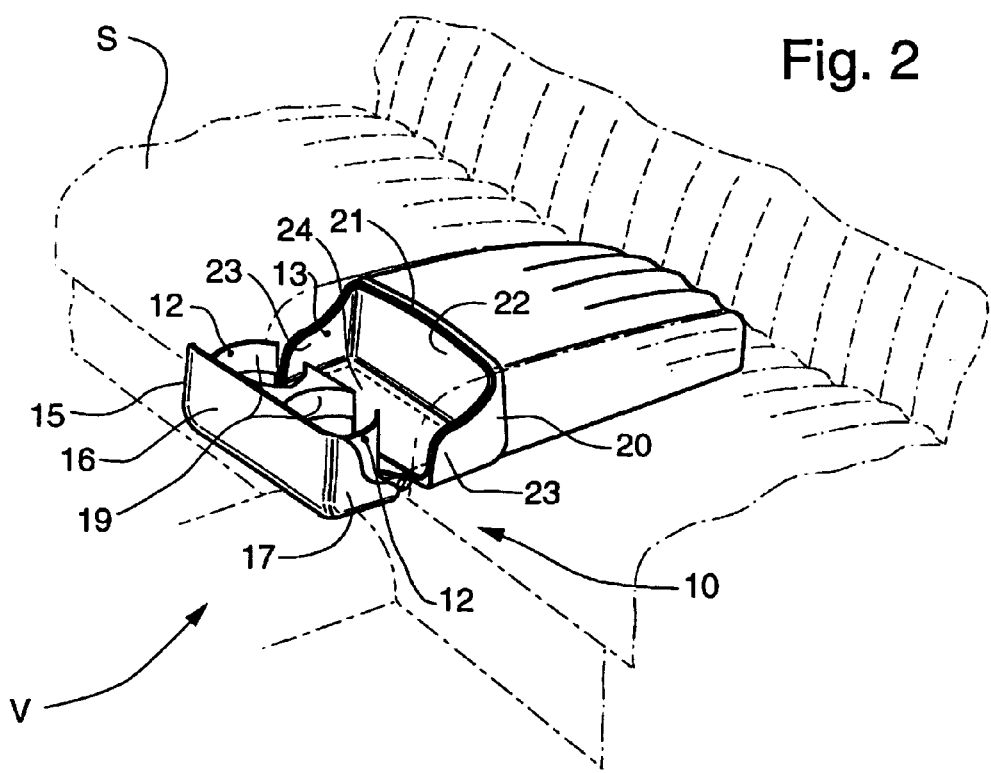
FIG. 2 is a left, front perspective view of the cupholder similar to that of FIG. 1, but with the cupholder being placed into the open, operative position.
Figure 3:
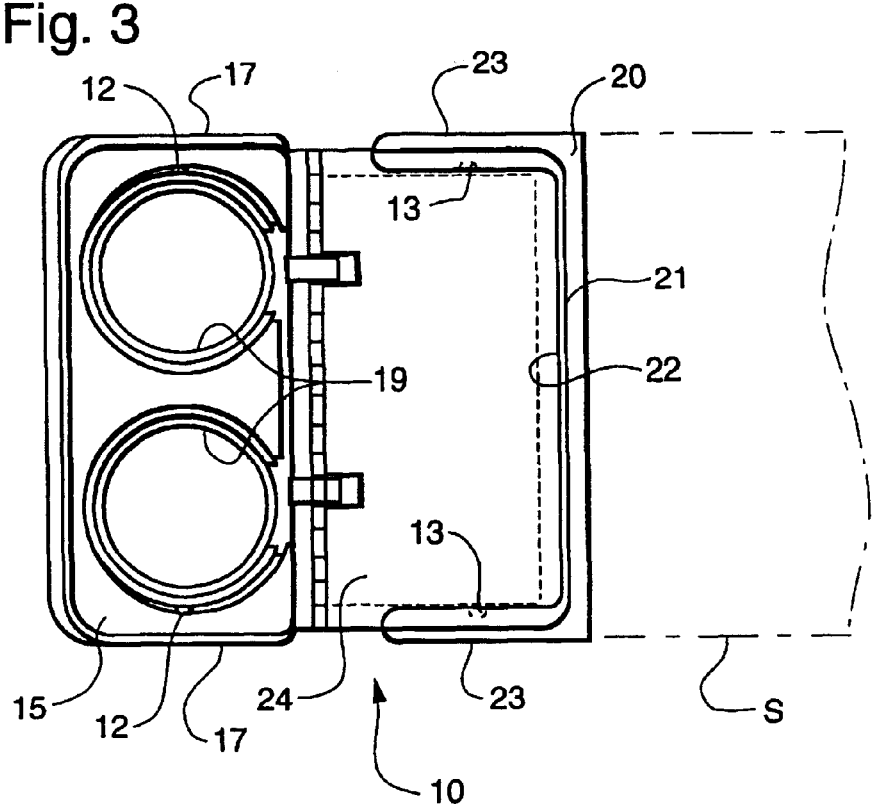
FIG. 3 is a top plan view of the cupholder shown in FIG. 2 in the open, operative position.

Referring to the perspective views of FIGS. 1–3, a cupholder assembly incorporating the principles of the instant invention can best be seen. Any references to left and right or front and rear are used as a matter of convenience and are determined by reference to a conventional automotive seat on which a passenger or operator would normally sit facing the forward direction of travel of the vehicle V in which the seat is mounted. The cupholder assembly 10 is preferably mounted at the forward edge of the central portion of the vehicle V seat S between a leftmost seat position and a rightmost seat position so as to form a continuous profile therewith across the transverse width of the seat S.

With such a configuration, the cupholder assembly 10 would facilitate the utilization of the seat as a seating position when in the closed position as depicted in FIG. 1. Preferably, the outer surface of the cupholder assembly 10 would be covered with the same material forming the seating surface of the seat S. For example, a leather seat S would result in the cupholder assembly 10 having a leather covering thereon so as to conform to and match the rest of the seat structure.

The cupholder assembly 10 is pivotally movable between a closed position depicted in FIG. 1 and an open or operative position depicted in FIGS. 2 and 3. The cupholder assembly 10 is formed with a rotatable lid member 15 pivotally connected by a hinge sub-assembly 25 to a base portion 20. The lid member 15 has a contoured, curved outer surface 16 that is configured to form a contiguous seating surface with the adjacent seat structure S when the lid member 15 is moved into the closed position. When pivoted to the open position, the lid member 15 exposed a pair of molded container holder 19 formed in a tiered configuration, preferably a three-tiered configuration, with the smallest diameter tier being located at the bottom of the container holders 19 to accommodate a wide variety of cups, mugs and bottles. Preferably, the lid member 15 and the container holders 19 are molded into a unitary body and are serviceable as such.

The base portion 20 is mounted to the supporting seat structure S in a fixed manner to form a stationary base from which the lid member 15 is pivotally movable. When the lid member 15 is rotated into the closed position as depicted in FIG. 1, the combined lid member 15 and base portion 20 provide a seating surface that is contiguous and functional with the adjacent seat structure S. The base portion 20 has a U-shaped upright wall 21 formed with a transverse back wall 22 and a pair of contoured side walls 23 extending forwardly from the respective transverse ends of the back wall 22. The contoured side walls 23 are shaped to mate with the side walls 17 of the lid member 15. A generally planar horizontal floor member 24 spans between the side walls 23 and joins the back wall 22 at the rearward edge thereof to provide a support surface for the placement of a fast food container or the like when the lid member 15 has been pivoted to the open position.

The hinge sub-assembly 25 is located at the forward edge of the floor member 24 so that the lid member 15 can rotate forwardly from the closed position to the open position and expose the floor member 24 of the base portion 20 with the lid member 15 then located forwardly of the base portion 20. The depth of the cupholder assembly 10 is designed to permit the lid member 15 to touch off the carpet on the floor F of the vehicle V, which reduces vibration when the lid member 15 is rotated into the open position. Furthermore, the lid member 15 is located when in the open position so that the conventional controls of the vehicle V on the control panel (not shown) for heating, air conditioning, radio, etc. are not blocked by the opened cupholder assembly 10.

A detent button 12 on the side of the cup retainers 19 is engageable with a corresponding detent pocket 13 formed in the side wall 23 of the base portion 20 to retain the lid portion 15 in the closed position. The deformable detention button 12 and pocket 13 will yield with a moderate amount of force applied to the lid portion 15 to allow the lid portion 15 to rotate about the hinge 25 and move into the open position.

Figure 4:
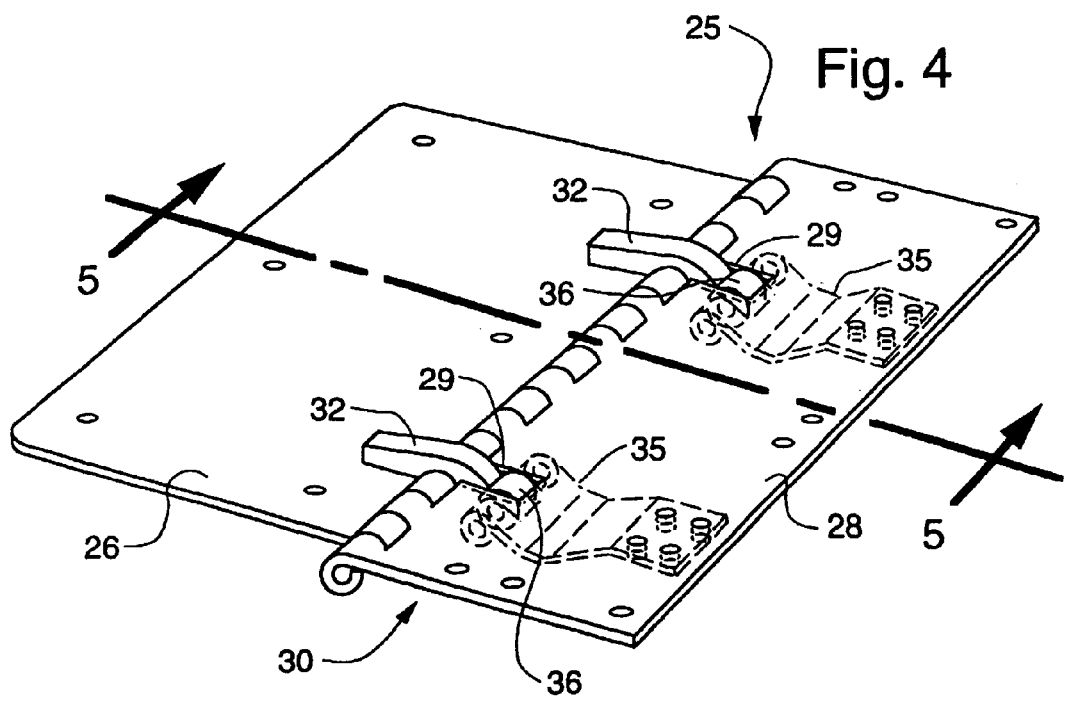
FIG. 4 is a left, rear perspective view of the hinge structure of the cupholder depicted in FIG. 2, the underlying stop members being shown in phantom.
Figure 5:
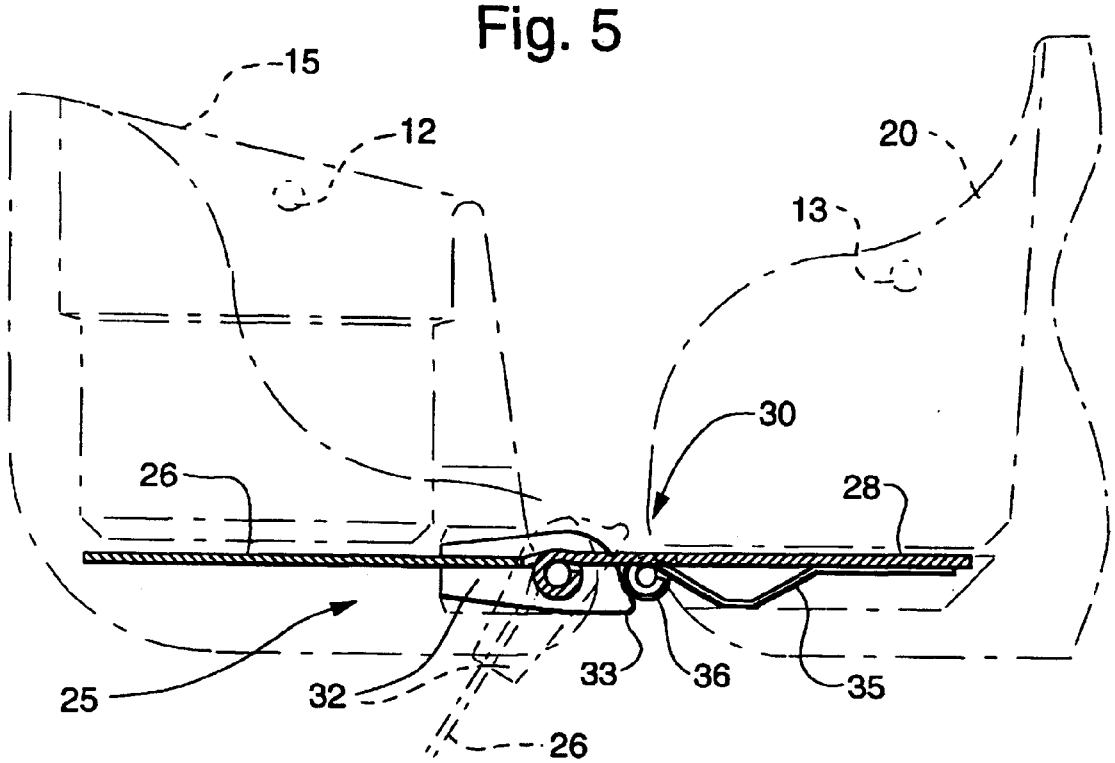
FIG. 5 is vertical cross-sectional view of the hinge structure taken along lines 5—5 of FIG. 4, the cupholder structure mounted thereto being shown in phantom in the open position, the over-rotation of the lid portion permitting the breakaway function of the hinge being depicted in phantom.
Figure 6:
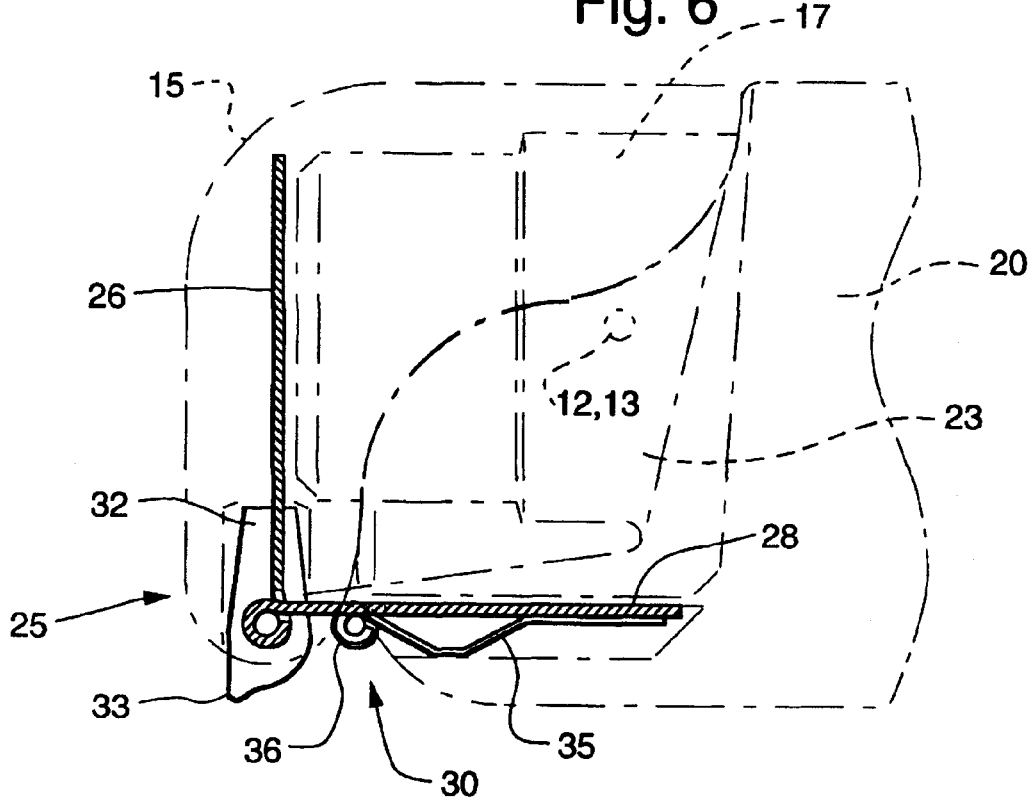
FIG. 6 is a cross-sectional view similar to that of FIG. 5 but with the cupholder moved into the closed position.

The hinge sub-assembly 25 is best seen in FIGS. 4–6 and is preferably a separate sub-assembly of the cupholder assembly 10, as is depicted in FIG. 4. The hinge sub-assembly 25 is preferably formed with a lid plate 26 pivotally connected to a base plate 28. The lid member 15 is thus connected to the lid plate 26 and the base portion 20 is connected to the base plate 28. To restrict rotation of the lid member 15 to the proper open position with the container holders 19 oriented generally vertically, the hinge sub-assembly 25 is provided with a stop mechanism 30.

The lid plate 26 is manufactured with a pair of abutments 32 projecting from said lid plate 26 into corresponding slots 29 formed in the base plate 28 rearwardly of the hinge sub-assembly 25. Each of the abutments 32 include a tab projection 33 that is engageable with a corresponding stop member 35 attached to the base plate 28. Preferably, each of the stop members 35 are formed as a spring member having a rolled edge 36 that is engageable with the corresponding tab projection 33 to stop pivotal movement of the lid member 15 when the lid plate 26 is substantially parallel to the base plate 28.

The hinge sub-assembly 25 described above can provide a breakaway function in the form of an ability of the lid portion 15 to over-rotate relative to the base portion. When an unexpected or abusive load is placed on the lid member 15, the stop members 35, as best seen in phantom in FIG. 5, can deflect upwardly into the slots 29 allowing the rearwardly extending tab projections 33 on the abutments 32 to rotate upwardly through the slots 29 past the rolled edge 36 of the stop members 35, thus permitting the lid portion 15 to fall below the horizontally oriented open position and drop to the floor of the vehicle V.

This breakaway function will protect the cupholder assembly 10 from significant damage in the event of an unexpected or abusive load. Furthermore, the cupholder assembly 10 can be reinstated into an operative condition by simply rotating the lid portion 15 upwardly about the hinge 25 to allow the tab projections 33 to deflect the stop members 35 downwardly until the abutments 32 can move past the rolled edges 36 into the orientation shown in solid lines in FIGS. 5 and 6, from which the stop members 35 can again serve to position the lid member 15 in the normal open position by engagement with the cam surfaces formed by the rearwardly extending tab projections 33.

The cupholder assembly 10 configured as described above is simply and effectively operable in a manner heretofore unknown in the art. The cupholder assembly 10 forms the forward portion of a central portion of the vehicle seat S, on either the front or rear seat of the vehicle V, and is configured to present to the occupant a seating surface that is contiguously matched to the surrounding and adjacent seats S when the cupholder assembly 10 is oriented in the closed position, as depicted in FIG. 1. One skilled in the art will readily recognize that the seat structure S can be a full bench seat, a split seat structure with the cupholder assembly 10 being a portion of on a the seat structure halves, or a seat having a separate center portion housing the cupholder assembly 10. Simply rotating the lid member 15 about the hinge 25 to move the lid member 15 forwardly from the base portion 20 until the tab projection 33 of the abutment 32 engages the rolled edge 36 of the stop member 35 halts the rotation of the lid member 15 at the open position where the lid member 15 is slightly resting on the floor carpet immediately beneath the lid member 15 to prevent vibration of the cupholder assembly 10 when opened.

The opened cupholder assembly 10 presents a pair of tiered container holders 19 to the occupant as well as a rearward support area that is surrounded by the back wall 22 and side walls 23 of the base portion 20 and the forwardly rotated lid member 15. This support area is defined by the floor member 24 of the base portion 20 and can be used to contain items such as a fast food container (not shown). The tiered container holders 19 provide differently sized openings for fitting a wide variety of drink containers. When operative use of the cupholder assembly 10 as a cup holder is no longer desired, the lid member 15 can be simply rotated rearwardly into a closed orientation where the container holders 19 are located within the support area above the floor member 24 of the base portion, as is depicted in phantom in FIG. 6.

The side walls 17 of the lid member 15 mate with the side walls 23 of the base portion 20 to form the forward portion of the supporting seat in a manner that can barely be noticed, particularly with the outer surface 16 of the lid member being covered with the same material forming the seating surface of the adjacent and contiguous seats S. The use of a breakaway hinge design permits the cupholder assembly 10 from being damaged by unexpected abusive loads that might be imposed on the opened lid member 15. If the lid member 15 becomes over-rotated from the base portion 20, the lid portion 15 can be repositioned into an operative orientation by simply rotating the lid portion 15 until the abutments 32 are placed beneath the stop members 35.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A cupholder assembly forming a forward portion of a part of a vehicle seat, comprising:
   a base portion mounted to said vehicle seat;
   a lid member connected to said base portion and being selectively pivotally movable between a closed position and an opened position, said lid member forming a contiguous seating surface with adjacent vehicle seat structure when said lid member is in said closed position, said lid member exposing a container holder and a support area rearward of said container holder when said lid member is moved into said opened position, said support area being bounded vertically by a back wall and a pair of forwardly extending side walls of said base portion and by said container holder when said lid member is moved into said opened position; and
   a hinge apparatus interconnecting said base portion and said lid member to provide a pivot axis for the movement of said lid member located at a forward edge of said base portion.

2. The cupholder assembly of claim 1 wherein said lid member includes a pair of container holders formed in a tiered configuration to provide reception for differently sized containers.

3. The cupholder assembly of claim 1 wherein said hinge apparatus includes a stop mechanism restricting the pivotal movement of said lid member to a fully opened position.

4. The cupholder assembly of claim 1 wherein said hinge apparatus is formed as a breakaway hinge permitting said lid member to over-rotate relative to said base portion if sufficient load is imposed on said lid member when in said opened position.

5. The cupholder assembly of claim 4 wherein said lid member includes side walls that are contoured to mate against the corresponding side walls of said base portion to form said contiguous seating surface when said lid member is in said closed position.

6. The cupholder assembly of claim 5 wherein said lid member includes a detention button engageable with a corresponding detention pocket formed in said base portion to restrict rotation of said lid member from rotating on said hinge assembly until a sufficient initial rotational force has been applied to said detention button out of said detention pocket.

7. In a seat for an automotive vehicle defining a seating surface for support of an occupant of said vehicle, said seat having a forward edge extending from a leftmost seating position to a rightmost seating position with a central portion of said seat being located therebetween, said seat having a depth dimension extending rearwardly from said forward edge to an upright back portion, the improvement comprising:
   a cupholder assembly forming the forward edge of the central portion of said seat, said cupholder assembly terminating at a break line oriented generally parallel to said forward edge and being positioned rearwardly of said forward edge when said cupholder assembly is in a closed position to define a depth dimension of said cupholder assembly, said depth dimension of said cupholder assembly being less than half of said depth dimension of said seat, said cupholder assembly being movable between said closed position and an opened position and forming a continuous seating surface with adjacent seat structure on three sides of said cupholder assembly when said cupholder assembly is in said closed position.

8. The seat of claim 7 wherein said cupholder assembly exposes a container holder and a support area rearward of said container holder when said cupholder assembly is moved into said opened position.

9. The seat of claim 8 wherein said cupholder assembly comprises:
- a base portion mounted to said central portion of said seat;
- a lid member connected to said base portion and being selectively pivotally movable between a closed position and an opened position, said lid member forming a contiguous seating surface with adjacent seat structure when said lid member is in said closed position, said lid member having formed therein a pair of container holders being positioned in said support area when said lid member is in said closed position so as to expose said support area rearward of said container holders when said lid member is moved into said opened position; and
- a hinge apparatus interconnecting said base portion and said lid member to provide a pivot axis for the movement of said lid member located at a forward edge of said base portion.

10. The seat of claim 9 wherein said support area is bounded vertically by a back wall and a pair of forwardly extending side walls of said base portion and by said container holders when said lid member is moved into said opened position.

11. The seat of claim 10 wherein said lid member includes a detention button engageable with a corresponding detention pocket formed in said base portion to restrict rotation of said lid member from rotating on said hinge apparatus until a sufficient initial rotational force has been applied to force said detention button out of said detention pocket.

12. The seat of claim 11 wherein said lid member includes side walls that are contoured to mate against the corresponding side walls of said base portion to form said contiguous seating surface when said lid member is in said closed position, said detention button being formed on said container holders for alignment with detention pockets formed on said side walls of said base portion.

13. The seat of claim 10 wherein said hinge apparatus is formed as a breakaway hinge permitting said lid member to over-rotate relative to said base portion if sufficient load is imposed on said lid member when in said opened position.

14. The seat of claim 13 wherein said hinge apparatus includes a stop mechanism restricting the pivotal movement of said lid member to a fully opened position.

15. A seat for an automotive vehicle comprising:
- a seating surface on which an occupant sits, said seating surface including a forward edge extending generally transversely, said seating surface being divisible into a left seating position, a right seating position and a central seating position between said left and right seating positions; and
- a cupholder assembly formed in said central seating position at said forward edge, said cupholder assembly being movable between an opened position and a closed position in which said cupholder assembly forms a seating surface contiguous with adjacent seat structure in said left seating position, in said right seating position and in said central seating position, said central seating position having seating surface rearwardly of said cupholder assembly when said cupholder assembly is in said opened position, said cupholder assembly including:
  - a base portion mounted to said seat; and
  - a lid member connected to said base portion and being selectively pivotally movable between a closed position and an opened position, said lid member having formed therein a pair of container holders and a support area positioned rearwardly of said container holders, said container holders being positioned in said support area when said lid member is in said closed position so as to expose said support area rearward of said container holders when said lid member is moved into said opened position.

16. The seat of claim 15 wherein said cupholder assembly further comprises:
- a hinge apparatus interconnecting said base portion and said lid member to provide a pivot axis for the movement of said lid member located at a forward edge of said base portion, said hinge apparatus including a stop mechanism stopping the rotation of said lid member at said opened position.

17. The seat of claim 16 wherein said support area is bounded vertically by a back wall and a pair of forwardly extending side walls of said base portion and by said container holders when said lid member is moved into said opened position.

18. The seat of claim 17 wherein said lid member includes side walls that are contoured to mate against the corresponding side walls of said base portion to form said contiguous seating surface when said lid member is in said closed position, said lid member includes a detention button formed on said container holders to be engageable with a corresponding detention pocket formed in said base portion to restrict rotation of said lid member from rotating on said hinge apparatus until a sufficient initial rotational force has been applied to force said detention button out of said detention pocket.

* * * * *